United States Patent [19]

Takahashi

[11] Patent Number: 5,074,634

[45] Date of Patent: Dec. 24, 1991

[54] OPTICAL MULTIPLEXING/DEMULTIPLEXING DEVICE

[75] Inventor: Mitsuo Takahashi, Matsudo, Japan

[73] Assignee: Seikoh Giken Co., Ltd., Matsudo, Japan

[21] Appl. No.: 542,075

[22] Filed: Jun. 22, 1990

[30] Foreign Application Priority Data

Jan. 26, 1990 [JP] Japan ................................. 2-16974

[51] Int. Cl.⁵ .............................................. G02B 6/28
[52] U.S. Cl. .................................... 359/127; 359/115; 385/24
[58] Field of Search ............... 350/96.12, 96.15, 96.16, 350/96.29; 370/1, 3

[56] References Cited

U.S. PATENT DOCUMENTS

| | | | |
|---|---|---|---|
| 4,343,532 | 8/1982 | Palmer | 350/96.16 X |
| 4,556,279 | 12/1985 | Shaw et al. | 350/96.15 |
| 4,737,007 | 4/1988 | Alferness et al. | 350/96.15 X |
| 4,834,481 | 5/1989 | Lawson et al. | 350/96.15 |
| 4,909,584 | 3/1990 | Imoto et al. | 350/96.15 |
| 4,953,935 | 9/1990 | Suchoski, Jr. et al. | 350/96.16 |

Primary Examiner—John D. Lee
Attorney, Agent, or Firm—Spencer & Frank

[57] ABSTRACT

An optical multiplexing/demultiplexing device consisting of one or more units, each of which consists of one or more components constituting 2×2 circuits, each of which consists of a pair of substrates having a pair of V-grooves arranged to mate with each other and a pair of optical fibers which are installed in the pair of V-grooves connecting through a single unit one. One optical fiber is thereby directly connected through a single unit to a plurality of components arranged in series in the single unit to constitute a tree structure for multiplexing.

5 Claims, 2 Drawing Sheets

PRIOR ART

OPTICAL MULTIPLEXING/DEMULTIPLEXING DEVICE

BACKGROUND OF THE INVENTION

The present invention relates to an optical multiplexing/demultiplexing device of the power distributing type for use in multiplexing and demultiplexing optical fiber communication circuits. In particular, it relates to an optical multiplexing/demultiplexing device for multiplexing an optical signal into four or more optical signals, or demultiplexing four or more optical signals into a single output signal.

Optical multiplexing/demultiplexing devices with multiple ports, which are used for multiplexing or demultiplexing optical signals in optical fiber communication circuits, have conventionally been made by scrubbing the optical fibers, thermally alloying the optical fibers, and by using optical waveguides.

FIGS. 3(A) and 3(B) show a conventional optical multiplexing/demultiplexing device which is made by scrubbing optical fibers. FIG. 3(A) shows a cross-sectional view cut across the optical axes of the optical fibers. FIG. 3(B) shows a cross-sectional view cut along the optical axes of the optical fibers.

The conventional optical multiplexing/demultiplexing device will be described hereinafter.

V-grooves 23 and 24 are fabricated by manual work at the centers of a pair of substrates 21 and 22. Optical fibers 25 and 26 are put into V-grooves 23 and 24 and fixed there by an adhesive agent. Thereafter, clads 29 and 30 of the optical fibers are scrubbed together with substrates 21 and 22 in parallel with the optical axes thereof until cores 27 and 28 of the optical fibers are just exposed. Substrates 21 and 22 are then assembled together with optical fibers 25 and 26 to form the optical multiplexing/demultiplexing device so that the scrubbed surfaces of optical fibers 25 and 26 mate each other on a pair of substrates 21 and 22.

With the above-mentioned structure, in the 2×2 optical multiplexing/demultiplexing device shown in FIGS. 3(A) and 3(B), almost all the optical input $P_i$ from one end of the optical fiber 25 is transmitted within the core 27. However, there exists a leakage of light from the boundary of core 27 and clad 29, which forms an Evanescent field, most of this light leakage occurring near the core portion. By scrubbing off a surface of the clad 30 of optical fiber 26 and the clad 29 of optical fiber 25, the distance S between the cores 27 and 28 may be selected. Also, as shown in FIG. 3(B), the contacting length L of fibers 25 and 26 may be selected.

By varying the distance S and the length L, the amount of photocoupling of optical fibers 25 and 26 generated through the Evanescent field may be changed. By adjusting the amount of photocoupling, the quantity of light transmitted from optical fiber 25 to fiber 26 may be adjusted. Thus the input light $P_i$ from the optical fiber 25 may be multiplexed to output powers $P_{o1}$ and $P_{o2}$, with $P_{o1}$ and $P_{o2}$ having a predetermined ratio. This type of optical multiplexing/demultiplexing device is of the power distributing type, and therefore may be used for power distribution.

The Evanescent field has a so-called wavelength dependent nature in which the spreading pattern of light changes according to the wavelength of the light. By utilizing this phenomena and by appropriately selecting the distance S between the cores and the contacting length L, a wavelength-divided type multiplexing/demultiplexing device may be formed, in which light having multiple wavelengths, consisting of a plurality of different optical wavelengths, may be wavelength-divided to branch into a plurality of outputs.

In the power distributing type of optical multiplexing/demultiplexing device, in which an input signal $P_i$ of a single optical wavelength of 1300 nanometer is branched into eight optical output ports P1 to P8, seven 2×2 multiplexing/demultiplexing circuits are used, each of the circuits being designed to have a 50:50 multiplexing ratio.

Optical fibers 31 and 32 of optical multiplexing/demultiplexing unit A consisting of a 2×2 circuit are connected to optical fibers 33 and 34 of optical multiplexing/demultiplexing units B and C, each consisting of a 2×2 circuit. Optical fibers 35 and 36 of optical multiplexing/demultiplexing unit B consisting of a 2×2 circuit are connected to optical fibers 39 and 40 of optical multiplexing/demultiplexing units D and E, each consisting of a 2×2 circuit. Optical fibers 37 and 38 of optical multiplexing/demultiplexing unit C consisting of a 2×2 circuit are connected to optical fibers 41 and 42 of optical multiplexing/demultiplexing units F and G, each consisting of a 2×2 circuit. Connections between two optical fibers are actualized by using optical fiber connectors labelled 43, or by means of arc discharges.

Internal optical fiber connections require additional assembling, scrubbing, and testing costs. Welding of optical fibers by means of arc discharges degrades the optical performance of the device due to its abrupt heat-cool cycle and thus the optical power losses at the respective internal connection junctions are accumulated in the optical fiber transmission system.

Multiplexing of four to 12 core optical fibers, which is being put into practice, requires a greater number of connection points. For instance, the number of connection points for demultiplexing the optical signals into eight core optical fibers is calculated to be 48 points as shown in FIG. 4, and thus a compact, light-weight version is difficult to be actualized.

An objective of this invention is therefore to provide an optical multiplexing/demultiplexing device of a compact, light-weight type with reduced power losses at its internal connection junctions, reducing the number interconnections among the units consisting of one or more components, each of which consists of a pair of substrates and a pair of optical fibers in the system configuration, where an optical fiber can pass through a single unit consisting of a plurality of components connected in series to multiplex/demultiplex the optical signals.

SUMMARY OF THE INVENTION

An optical multiplexing/demultiplexing device built in accordance with the present invention consists of a plurality of units each consisting of one or more components connected in series, each of which provides a V-groove along the lateral edge of a substrate and an optical fiber which is installed in and fastened to the substrate; wherein the clad of each optical fiber is scrubbed together with the corresponding substrate to mate until the core of each optical fiber is just exposed, and the pair of substrates which constitute a component are in contact with each other so that one optical fiber can contact the other when in position. A unit consisting of a single component is composed of a first optical fiber attached to a first V-groove on a first substrate, and another set of units each consisting of a plurality of components with a second single optical fiber passing therethrough, each of these components consisting of the second optical fiber attached to a second V-groove on a second substrate. These components are arranged in every fixed span so that the surfaces of the substrates whereon the first and second optical fibers are installed in the first and second V-grooves on the first and second substrates are scrubbed in parallel with the optical axes of said optical fibers until the cores of the optical fibers are just exposed, and so that the corresponding pairs of scrubbed surfaces can mate with each other.

BRIEF DESCRIPTION OF THE DRAWINGS

FIG. 3(A) is a cross-sectional view cut across the optical axes of the optical fibers. FIG. 3(B) is a cross-sectional view cut along the optical axes of the optical fibers.

DESCRIPTION OF THE PREFERRED EMBODIMENT

The present invention will be described hereinafter by referring to the attached drawings.

Figure 1:
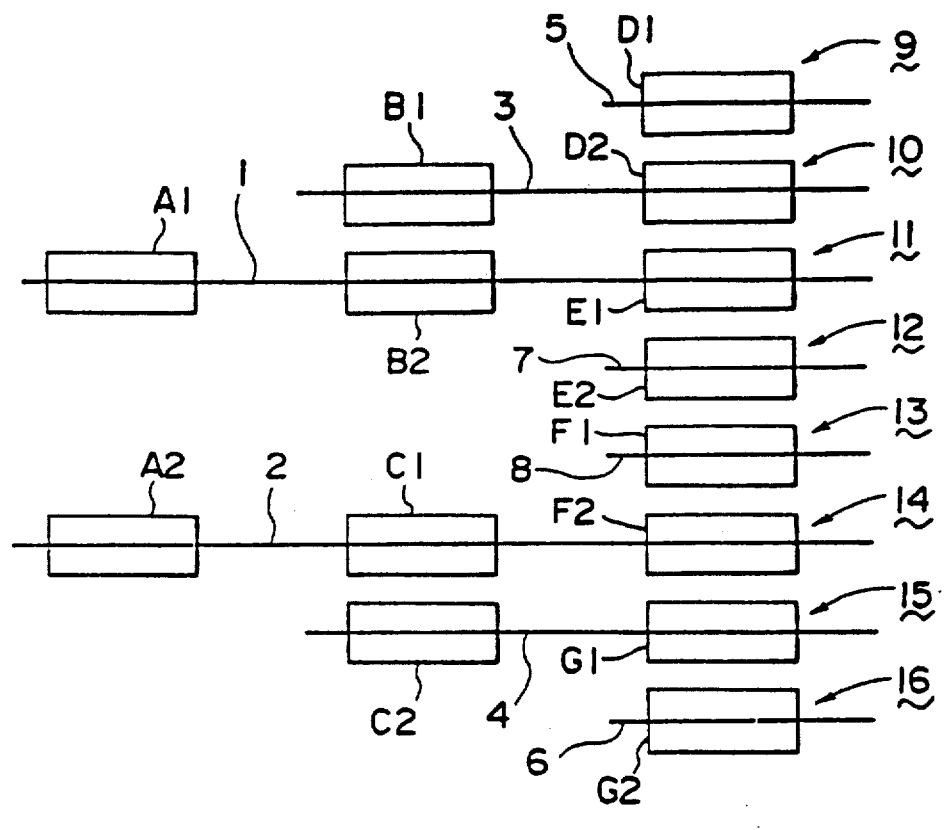
FIG. 1 is a schematic view showing an embodiment of an optical multiplexing/demultiplexing device built in accordance with the invention, which depicts an arrangement of the components before assembly.

FIG. 1 is a schematic view showing an embodiment of the optical multiplexing/demultiplexing device built in accordance with the present invention. In FIG. 1, the respective units and components are arranged in position before assembly, and indicate the demultiplexing of an optical input signal into eight output ports.

Used in the device shown in FIG. 1 are unit 11 consisting of an optical fiber 1 attached in series to substrates A1, B2, and E1, unit 14 consisting of another optical fiber 2 attached in series to substrates A2, C1, and F2, unit 10 consisting of further optical fiber 3 attached in series to substrates B1 and D2, unit 15 consisting of yet further optical fiber 4 attached in series to substrates C2 and G1, unit 9 consisting of yet further optical fiber 5 attached to substrate D1, unit 16 consisting of yet further optical fiber 6 attached to substrate G2, unit 12 consisting of yet further optical fiber 7 attached to substrate E2, and unit 13 consisting of yet further optical fiber 8 attached to substrate F1. Optical fibers are installed in V-grooves (not shown) of the substrates.

The surfaces of the substrates wherein optical fibers are installed to constitute units 9 through 16 are scrubbed together with the clads of the optical fibers in parallel with the optical axes of the optical fibers until the cores of the optical fibers are just exposed.

Figure 2:
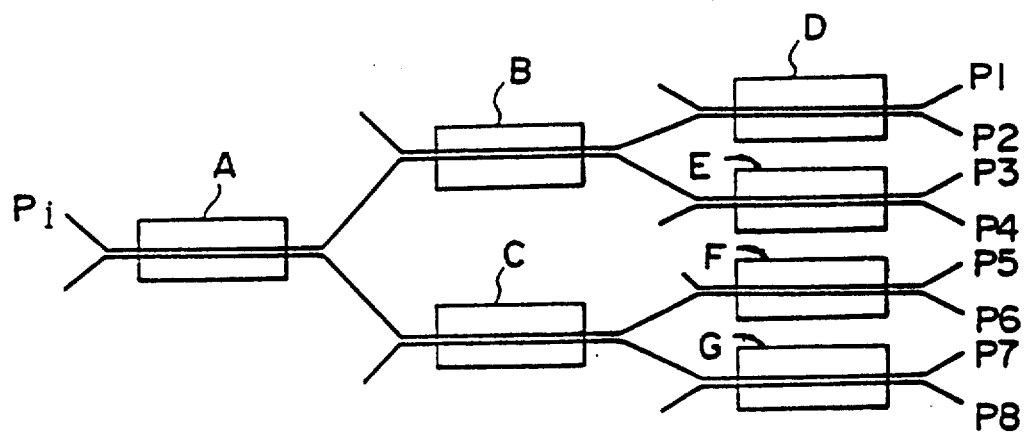
FIG. 2 is a schematic view showing an assembly of the components shown in FIG. 1 to form the optical multiplexing/demultiplexing device of the invention.
Figure 3:
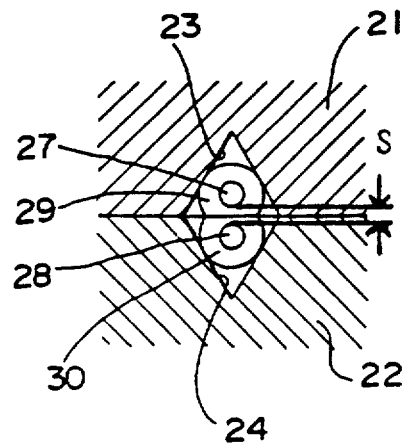
FIGS. 3(A) and 3(B) are schematic views showing part of a conventional optical multiplexing/demultiplexing device, which is made by scrubbing the optical fibers.
Figure 3:
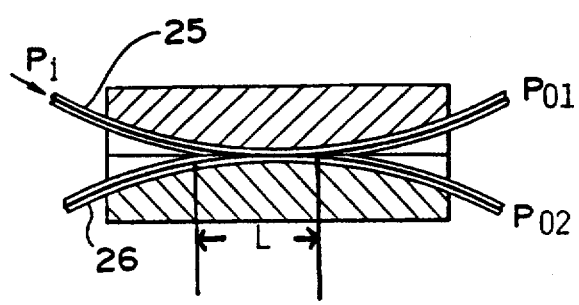
Figure 4:
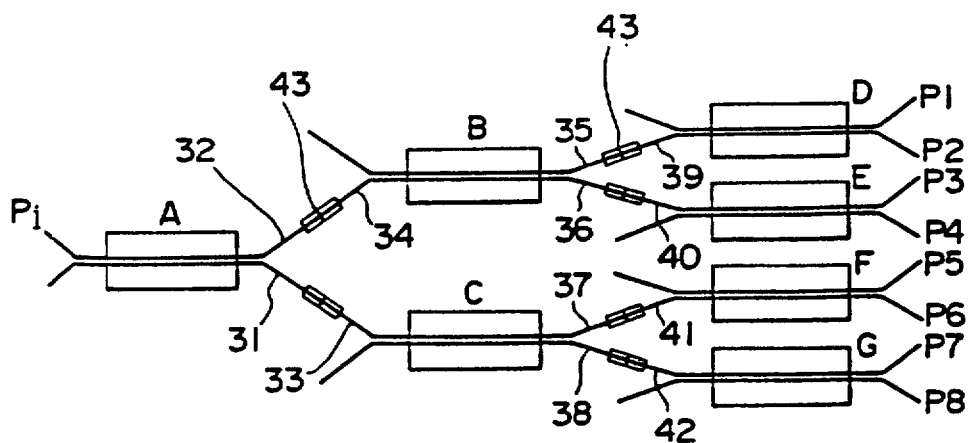
FIG. 4 shows an example of a conventional optical multiplexing/demultiplexing device having a single output/input port and eight input/output ports.

FIG. 2 is a view showing the assembly of components A through G constructed by connecting units 9 through 16 shown in FIG. 1. Substrates A1 and A2, B1 and B2, C1 and C2, D1 and D2, E1 and E2, F1 and F2, and G1 and G2 are respectively attached so that the scrubbed surfaces of the corresponding optical fibers can contact one another to construct components A through G. They are assembled so that no internal connection points exist in the device.

Therefore, optical input signal $P_i$ can be sent to output ports P1 through P8 without any internal connections. In this case, the strength of the input light is given as 0 dB, and the branching ratio of each optical multiplexing/demultiplexing device is 50:50. If there is no additional insertion loss, the quantity of light of $-3$ dB is theoretically lost for each stage and therefore each of the branched outputs at ports P1–P8 is $-9$ dB.

If the optical fibers are connected as in a conventional structure, the insertion loss at one stage is $-0.2$ to $-0.5$ dB, and thus 0.4 to 1.0 dB must be added for two stages.

In more general terms, FIG. 2 shows an optical multiplexing/demultiplexing device having n stages in tandem wherein the nth or output stage consists of four components D, E, F and G having a total of 8 output ports P1 to P8, the n-1st stage consists of two components B and C, and the first or input stage consists of a single component A.

In FIG. 2, n=3, and there are $2^{n-1}$, i.e. 7 components A to G, and $2^n$, i.e. 8 continuous optical fibers each having a core and a cladding region. $2^{n-1}$ or four of the optical fibers are disposed in first V-grooves of the respective components D, E, F, and G, $2^{n-2}$ or two of the fibers are disposed in first V-grooves of components B and C and in second V-grooves of components D and G, and two of the fibers are disposed in the first and second V-grooves of the component A of the input stage as well as in second V-grooves of components B and C and the second V-grooves of components E and F.

Portions of the cores of each of the optical fibers are exposed in the grooves of each of the components in which they are disposed by the removal of portions of their claddings thereby permitting transfer of power from one optical fiber of the component to the other. As a result, power $P_i$ applied to an optical fiber of the input stage is coupled to the $2^n$ output ports P1 to P8 of the output stage.

Optical input signal P can thus be sent to output ports P1 through P8 without any internal connections.

As described heretofore, the optical multiplexing/demultiplexing device built in accordance with the present invention can be made without any internal connections although the conventional optical multiplexing/demultiplexing device which is made by using optical connectors for connecting two optical fibers on the succeeding substrates together, or by means of an arc discharge to connect the two optical fibers together requires a greater number of components, increasing the assembling and testing costs, and causing the optical performance of the device to be degraded due to an abrupt heat-cool cycle increasing the power losses at the internal interconnection junctions.

The optical multiplexing/demultiplexing device built in accordance with the present invention is of the compact, light weight type. For instance, a new demultiplexing device having a single input port and 32 output ports is one twentieth the conventional device in both size and weight.

The fabrication cost of the new device will thus be reduced to a greater extent and the anti-shock/vibration performance greatly improved.

What is claimed is:

1. An optical multiplexing/demultiplexing device consisting of a plurality of units, each of said units being composed of one or more components connected in series, each of said components comprising:
- a substrate having a V-groove arranged along a lateral edge thereof; and
- an optical fiber installed in said groove and fastened to said substrate; wherein
- the cladding of each optical fiber is scrubbed together with the corresponding substrate to expose the core of each optical fiber, and a pair of substrates constituting a component are in contact with each other so that one optical fiber contacts the other optical fiber so that an optical input to one optical fiber is branched and output to the other optical fiber by photocoupling by the Evanescent field effect generated between said optical fibers;
- thereby constituting a set of units, each consisting of a first optical fiber attached to a first V-groove on a first substrate; and
- another set of units, each consisting of a plurality of components with a second single optical fiber passing therethrough, each of said components consisting of a second optical fiber attached to a second V-groove on a second substrate, so that said plurality of components are arranged so that the surfaces of said substrates whereon said first and second optical fibers are installed in said first and second V-grooves of said first and second substrates are scrubbed in parallel with the optical axes of said optical fibers until the cores of said optical fibers are just exposed and that the corresponding pairs of scrubbed surfaces can mate each other.

2. An optical multiplexing/demultiplexing device according to claim 1, wherein the optical multiplexing/demultiplexing device has four ports, said device comprising two units, each having a first optical fiber attached to a first V-groove on a first substrate; and two units each having a second single optical fiber attached to two second V-grooves on two second substrates.

3. An optical multiplexing/demultiplexing device according to claim 1, wherein the optical multiplexing/demultiplexing device has eight ports, said device comprising four units, each having a first optical fiber attached to a first V-groove on a first substrate; two units each having a second single optical fiber attached to two second V-grooves on two second substrates; and two units each having a third single optical fiber attached to two third V-grooves on two third substrates.

4. An optical multiplexing/demultiplexing device having n tandem stages for coupling optical power from an input stage to $2^n$ output ports of an output stage, said device comprising:
- $2^{n-1}$ components, each of said components comprising first and second substrates having contiguous parallel surfaces, the contiguous surfaces of said first and second substrates having first and second V-shaped directly opposing grooves therein, the input stage of said device having one of said components, the output stage having $2^{n-1}$ of said components, and each of the stages interposed between said input and output stages having twice the number of components as the preceding stage; and
- $2^n$ continuous optical fibers, each having a core and a cladding region surrounding said core, each continuous optical fiber being disposed in a groove of one component of at least one of said tandem stages, $2^{n-1}$ of said continuous optical fibers being disposed in the first grooves of respective components of only the nth of said tandem stages; $2^{n-2}$ of said continuous optical fibers being disposed in the first grooves of respective components of the n−1st of said tandem stages and second grooves of the nth of said tandem stages; said input stage having an optical fiber disposed in each of the first and second grooves thereof, each of the optical fibers disposed in the first and second grooves of said input stage being further disposed in respective second grooves of each succeeding stage of said tandem stages; portions of the cores of each of said optical fibers being exposed in the grooves of each of the components in which they are disposed by the removal of portions of the cladding of each core thereby permitting transfer of power therebetween, power applied to an optical fiber of said input stage being coupled to the $2^n$ output ports of said output stage.

5. An optical multiplexing/demultiplexing device according to claim 4 where n is equal to 3.

* * * * *